United States Patent
Luo

(10) Patent No.: US 12,264,910 B2
(45) Date of Patent: Apr. 1, 2025

(54) TARGET UNIT OF MACHINE VISION SYSTEM, TARGET ASSEMBLY AND MACHINE VISION SYSTEM

(71) Applicant: AUTEL INTELLIGENT TECHNOLOGY CORP., LTD., Guangdong (CN)

(72) Inventor: Wenhui Luo, Guangdong (CN)

(73) Assignee: AUTEL INTELLIGENT TECHNOLOGY CORP., LTD., Guangdong (CN)

(*) Notice: Subject to any disclaimer, the term of this patent is extended or adjusted under 35 U.S.C. 154(b) by 1123 days.

(21) Appl. No.: 17/142,613

(22) Filed: Jan. 6, 2021

(65) Prior Publication Data
US 2021/0156680 A1 May 27, 2021

Related U.S. Application Data

(63) Continuation of application No. PCT/CN2019/111922, filed on Oct. 18, 2019.

(30) Foreign Application Priority Data

Oct. 20, 2018 (CN) .......................... 201811225379.0

(51) Int. Cl.
*G01B 11/275* (2006.01)
*G06T 7/00* (2017.01)

(52) U.S. Cl.
CPC ........ *G01B 11/2755* (2013.01); *G06T 7/0004* (2013.01); *G01B 2210/283* (2013.01);
(Continued)

(58) Field of Classification Search
CPC .................. G01B 11/2755; G01B 2210/283
See application file for complete search history.

(56) References Cited

U.S. PATENT DOCUMENTS

| | | | | |
|---|---|---|---|---|
| 4,761,749 A | * | 8/1988 | Titsworth ........... | G01B 11/2755 356/139.09 |
| 2007/0101595 A1 | * | 5/2007 | Jackson ............. | G01B 11/2755 33/293 |

FOREIGN PATENT DOCUMENTS

| | | |
|---|---|---|
| CN | 202382945 U | 8/2012 |
| CN | 103134695 A * | 6/2013 |

(Continued)

OTHER PUBLICATIONS

International Search Report mailed Jan. 19, 2020; PCT/CN2019/111922.

*Primary Examiner* — Hovhannes Baghdasaryan
*Assistant Examiner* — Clara G Chilton

(57) ABSTRACT

The present invention belongs to the field of machine vision system technologies, and discloses a target unit of a machine vision system, a target assembly and a machine vision system, the target unit including a protective plate, a light absorbing layer and a light reflecting layer. The protective plate includes a connection surface. The light reflecting layer is connected to the light absorbing layer, one of the light absorbing layer and the light reflecting layer includes a preset pattern and is connected to the protective plate through the connection surface, and a surface that is of the other of the light absorbing layer and the light reflecting layer and that faces away from the protective plate is an outer surface of the target unit. In the target unit in the embodiments of the present invention, the protective plate can provide functions such as mechanical support, flatness and water resistance and scratch resistance, and a substrate in the prior art can be omitted, so that the weight of the target unit in this embodiment is reduced, and the thickness of a product is reduced, enabling that it is possible to make a thinner product. In addition, a product assembly process is simplified, and product costs are reduced.

13 Claims, 8 Drawing Sheets

(52) U.S. Cl.
CPC .................. *G01B 2210/303* (2013.01); *G06T 2207/30204* (2013.01)

(56) References Cited

FOREIGN PATENT DOCUMENTS

| CN | 205861929 U | * | 1/2017 |
| CN | 206038329 U | | 3/2017 |
| CN | 108618769 A | | 10/2018 |

* cited by examiner

TARGET UNIT OF MACHINE VISION SYSTEM, TARGET ASSEMBLY AND MACHINE VISION SYSTEM

This application is a continuation of International Patent Application No. PCT/CN2019/111922 filed on Oct. 18, 2019, which claims priority to Chinese Patent Application No. 201811225379.0 filed on Oct. 20, 2018, both of which are incorporated by reference herein in their entireties.

BACKGROUND

Technical Field

The present application relates to the field of machine vision system technologies, and in particular, to a target unit of a machine vision system, a target assembly including the target unit and a machine vision system including the target assembly.

Related Art

Some types of position determining systems, such as a wheel positioning system and an in-vehicle sensor calibration system, adopt machine vision system technologies to sense and measure related positions. In the machine vision system technologies, optical sensing devices such as a camera are usually adopted to determine positions of various target devices by sensing optical sensing devices such as a light reflecting target. For example, in the wheel positioning system, alignment information approximately a vehicle, such as a camber angle of a wheel, a driving height, a toe curve, an inclination angle and an angle relationship of a vehicle body relative to the wheel, can be obtained by sensing light reflecting targets. In the in-vehicle sensor calibration system, a sensor calibration frame can be adjusted to be aligned with an axis of a vehicle by sensing light reflecting targets that include light reflecting targets mounted at wheels and a light reflecting target mounted on the sensor calibration frame, and further, positions and axial directions of sensors such as a vehicle radar and a vehicle camera are accurately adjusted.

A typical light reflecting target is of a flat multi-layer structure, and generally includes a light reflecting layer sandwiched between front and rear glass plates. Due to high density of glass, such a structure is generally relatively heavy and is inconvenient to use.

Therefore, it is necessary to design a light reflecting target for ease of use by wheel calibration personnel.

SUMMARY

Embodiments of the present invention provide a light target unit of a machine vision system, a target assembly and a machine vision system including the target assembly, to resolve technical problems of a cumbersome target unit and inconvenience in use in the prior art.

The embodiments of the present invention provide the following technical solutions to resolve the technical problems.

A target unit of a machine vision system includes
a protective plate, including a connection surface;
a light absorbing layer; and
a light reflecting layer, the light reflecting layer being connected to the light absorbing layer, one of the light absorbing layer and the light reflecting layer including a preset pattern and being connected to the protective plate through the connection surface, and a surface that is of the other of the light absorbing layer and the light reflecting layer and that faces away from the protective plate being an outer surface of the target unit.

The embodiments of the present invention further provide the following technical solutions to resolve the technical problems.

A target assembly includes:
a housing, provided with a receiving groove; and
the target unit described above,
the protective plate being mounted to the housing, the protective plate being received in the receiving groove, and the connection surface facing away from an opening of the receiving groove.

The embodiments of the present invention further provide the following technical solutions to resolve the technical problems.

A machine vision system includes a four-wheel aligner and the target assembly described above.

Compared with the prior art, in the target unit provided in the embodiments of the present invention, the protective plate can provide functions such as mechanical support, flatness and water resistance and scratch resistance, and a substrate in the prior art can be eliminated, so that the weight of the target unit in this embodiment is reduced, and the thickness of a product is reduced, enabling that it is possible to make a thinner product. In addition, a product assembly process is simplified, a production time is shortened, and product costs are reduced.

BRIEF DESCRIPTION OF THE DRAWINGS

To describe the technical solutions in the embodiments of the present invention more clearly, the following briefly describes the accompanying drawings required for describing the embodiments of the present invention. Obviously, the accompanying drawings in the following descriptions are merely some embodiments of the invention, and a person of ordinary skill in the art may further obtain other accompanying drawings according to the accompanying drawings without creative efforts.

DETAILED DESCRIPTION

For ease of understanding the present invention, the present invention is described in more detail below with reference to the accompanying drawings and specific embodiments. It should be noted that, when a component is expressed as "being fixed to" another component, the component may be directly on the another component, or one or more intermediate components may exist between the component and the another component. When one component is expressed as "being connected to" another component, the component may be directly connected to the another component, or one or more intermediate components may exist between the component and the another component. The terms "vertical", "horizontal", "left", "right", "inner", "outside", and similar expressions used in this specification are merely used for the purpose of description, and only express substantial positional relationships. For example, for "vertical", if a positional relationship is not being strictly vertical, to achieve a purpose, but is being substantially vertical, or uses a vertical characteristic, it belongs to the scope of "vertical" described in this specification.

Unless otherwise defined, meanings of all technical and scientific terms used in this specification are the same as that usually understood by a person skilled in the technical field to which the present invention belongs. Terms used in the specification of the present invention are merely intended to describe objectives of the specific embodiment, and are not intended to limit the present invention. A term "and/or" used in this specification includes any or all combinations of one or more related listed items.

In addition, technical features involved in different embodiments of the present invention described below may be combined together if there is no conflict.

Figure 1:
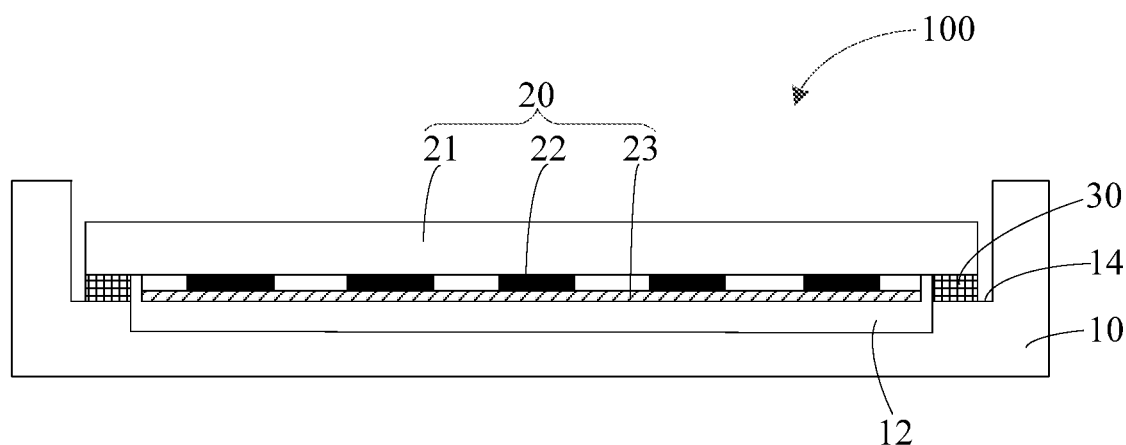
FIG. 1 is a schematic structural diagram of a target assembly of a machine vision system according to an embodiment of the present invention.
Figure 2:
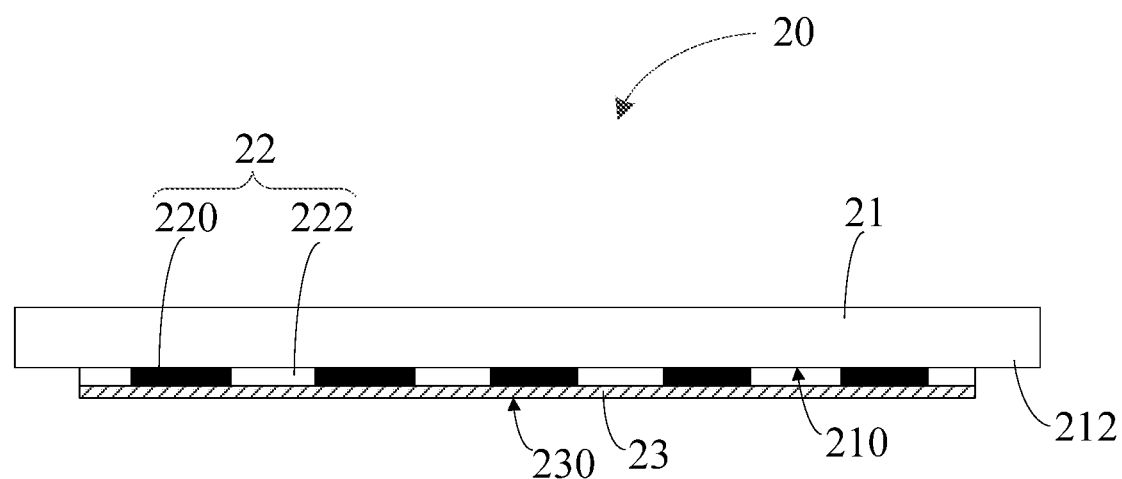
FIG. 2 is a schematic structural diagram of a target unit of the target assembly shown in FIG. 1, a light absorbing layer being located between a protective plate and a light reflecting layer in the target unit.

Referring to FIG. 1 and FIG. 2 together, a target assembly 100 of a machine vision system provided in the embodiments of the present invention includes a housing 10, a target unit 20 and a bonding portion 30. The target unit 20 is mounted to the housing 10 by using the bonding portion 30.

In this specification, the machine vision system is a technology of acquiring an image of a shot target by using an image shooting device (that is, for example, a type of camera photographic apparatus such as a CMOS or a CCD), and obtaining relevant position information according to the acquired image. Generally, in the machine vision system, an image signal is obtained by acquiring the shot image, is transmitted to a dedicated image processing system, such as a desktop computer or a notebook computer, to obtain morphological information of the shot target, and is converted into a digital signal according to information such as pixel distribution, brightness and colors. The image system performs various operations on these signals to extract features of the target, and further determines a position of the shot target according to a determining result.

The housing 10 is provided with a receiving groove 12, and an inner wall of the receiving groove 12 is provided with a step portion 14. The target unit 20 is received in the receiving groove 12, and the target unit 20 is supported on the step portion 14. The housing 10 may be made of a plastic material or a metal material. If made of a plastic material, the housing may be prepared by injection molding, casting or the like. If made of a metal material, the housing may be prepared by milling or the like.

The target unit 20 is received in the receiving groove 12, and the target unit 20 includes a protective plate 21, a light absorbing layer 22 and a light reflecting layer 23. The light absorbing layer 22 is located between the protective plate 21 and the light reflecting layer 23.

The protective plate 21 is a light transmission plate. One function thereof is to provide a light transmission protective layer for the whole target unit 20, the protective plate 21 has physical features of scratch resistance and water leakage resistance, and the other function thereof is to support the light absorbing layer 22 and the light reflecting layer 23, to provide higher planeness or flatness for the light reflecting layer 23.

In this specification, the "light transmission" is relative to a working band of the target unit 20, the target unit 20 cooperates with sensing instruments such as a camera, to reflect light or an electromagnetic wave of a band, and at least a part of the light or electromagnetic wave in a band is adapted to be captured by the sensing instruments such as a camera to form an image. A band captured by the sensing instruments such as a camera to form the image is referred to as the working band of the target unit 20. The "light transmission" means that light or an electromagnetic wave in the working band of the target unit 20 can pass substantially, and is not limited to a state that needs to be transparent to naked eyes. Therefore, the protective plate 21 may be made of ordinary glass and/or glass with a hardened surface, glass with anti-explosion measures such as adding an anti-explosion film, toughened glass and transparent plastic with higher flatness, for example, organic glass or an acrylic plate, PMMA, PC and PVC. The protective plate 21 may not be limited to the foregoing materials, and all materials with sufficient surface flatness that can provide functions of scratch resistance and water leakage resistance, transparency and the like can be applied.

The protective plate 21 includes a connection surface 210, and the connection surface 210 faces away from the opening of the receiving groove 12. An area of the connection surface 210 may be greater than an area of the light absorbing layer 22 and an area of the light reflecting layer 23, so that the protective plate 21 has an edge portion 212, the edge portion 212 protruding from an edge of the light absorbing layer 22 and an edge of the light reflecting layer 23. The edge portion 212 is supported on the step portion 14, and the light absorbing layer 22 and the light reflecting layer 23 are suspended in the receiving groove 12. With such a structure, the light absorbing layer 22 and the light reflecting layer 23 are not in contact with the housing 10, which can prevent the light absorbing layer 22 and the light reflecting layer 23 from being damaged or pressed to deform by a collision with the housing 10, thereby preventing the flatness of the light absorbing layer 22 and the light reflecting layer 23 from being affected.

The connection surface 210 has sufficient surface flatness, so that the light absorbing layer 22 and the light reflecting layer 23 may be flat attached to the connection surface 210, and the camera may obtain a high-precision image. It is crucial for high-precision image recognition and high-precision position determining to provide good planeness for the light reflecting material, and higher planeness or flatness indicates that higher-precision image recognition and position determining can be obtained. Currently, in the art, commonly used materials that provide support for the target unit include glass, organic glass, a plastic plate, a PCB board (a material board used for making a printed circuit board) and a metal board such as aluminum. However, in an actual application, it is found that the flatness of the foregoing materials is not completely the same, and glass can provide higher planeness under an ordinary process condition, and is the preferred material for a support structure of the target unit in industrial manufacturing. However, as described above, materials suitable for the protective plate in the embodiments of the present invention is not limited to glass, and all current and future developed material plates that meet relevant requirements can be applied.

The "sufficient surface flatness" means surface flatness that meets product use requirements. For the target unit 20 of different precisions, required surface flatnesses are different. In some target units 20 with lower precision requirements, surface flatness of the connection surface 210 may be relatively low.

A person skilled in the art should understand that, the thickness of the protective plate 21 may be correspondingly changed according to actual requirements. When the thickness is relatively large, it may be referred to as "protective plate (board or plate)", and when the thickness is relatively small, it may be referred to as "protective sheet".

The light absorbing layer 22 is connected to the protective plate 21 through the connection surface 210. The light absorbing layer 22 includes a preset pattern, and the pattern includes a pattern light absorbing region 220 and a pattern light transmission region 222. The pattern light absorbing region 220 is made of a light absorbing material, so that when light or an electromagnetic wave passing through the protective plate 21 is irradiated on the pattern light absorbing region 220, there is substantially no transmission at an irradiated position, and also substantially, no flare and reflection are generated. Alternatively, although a certain amount of transmission exists at the irradiated position, substantially no light or electromagnetic wave may be captured by a camera device after being reflected by the light reflecting layer 23 and passing through the light absorbing layer again. For example, the pattern light absorbing region 220 may be made of a black or dark material. The pattern light transmission region 222 may be a hollow region or a light transmitting material, and may allow light or an electromagnetic wave in the working band of the target unit 20 to pass through.

The light reflecting layer 23 is connected to the light absorbing layer 22, and a surface 230 of the light reflecting layer 23 that faces away from the protective plate 21 is an outer surface of the target unit 20. The light reflecting layer 23 is used for reflecting the light or the electromagnetic wave passing through the pattern light transmission region 222, so that the reflected light or electromagnetic wave passes through the pattern light transmission region 222 and the protective plate 21 again in sequence and then enters the camera. The light reflecting layer 23 only needs to reflect the light or the electromagnetic wave in the working band of the target unit 20. For example, the light absorbing layer 22 may be coated or printed with a light reflecting material to form the light reflecting layer 23, or a light reflecting paper may be used as the light reflecting layer 23, or other materials with a light reflecting function such as a light reflecting film with a thin film layer, a flat sheet coated or plated with a light reflecting substance (the sheet may be made of any material suitable for being coated or plated with the light reflecting substance), and light reflecting fabric may be adopted. The pattern may be formed on the thin film layer of the light reflecting film by photoetching, printing or the like, or a white material layer such as a white paper or a white film may alternatively be used as the light reflecting layer. The pattern may be formed on the white material layer by photoetching, printing or the like.

In some embodiments, the light reflecting layer 23 is a retro light reflecting layer, and generally, may be a retro light reflecting paper, or a retro light reflecting film whose surface is a plastic film. If the camera device is relatively far away from the target and captures insufficient light, or has a relatively high requirement on target pattern imaging definition, preferably, the retro light reflecting layer is used as the light reflecting layer of the target. For example, in a four-wheel positioning system of a vehicle, the target unit 20 with the retro light reflecting layer is generally used.

In some embodiments, the light absorbing layer 22 is a film negative (that is, a material used for a film of a traditional camera; due to an adjustment of a manufacturing process, specific compositions of the material may differ, but a pattern is formed by using similar imaging principles), and the film negative is laid flat on the connection surface 210, and is connected to the protective plate 21 through the connection surface 210. The film negative forms a pattern, the pattern including the pattern light absorbing region 220 and the pattern light transmission region 222. Due to a flattenable feature of the film negative, when the film negative is used as the light absorbing layer 22, a higher-precision pattern can be formed on the film negative, so that the target image precision is higher.

The bonding portion 30 is bonded between the step portion 14 and the edge portion 212, the bonding portion 30 sealing the light absorbing layer 22 and the light reflecting layer 23 in the receiving groove 12. Preferably, the bonding portion 30 is waterproof, dampproof and dustproof adhesive, preferably has elasticity, and may buffer a part of force applied to the housing, and the force is not directly applied to the target unit. A position of the adhesive is a sealed connection of the housing, and the adhesive may be sealed, adhered and coated on the periphery to obtain better water and moisture resistance, thereby protecting components that are easily affected by moisture such as the light reflecting layer. The material of the bonding portion 30 may be adhesive such as adhesive sealant, silica gel, UV adhesive and AB adhesive, or may be finished backing adhesive of a company such as 3M, TESA and Sekisui. The design of the adhesive layer is optimized by using a plurality of substances, a plurality of coating methods and a plurality of combination forms, so that the target assembly 100 can have a plurality of functions such as better antivibration and fall prevention and water and dust resistance.

Figure 3:
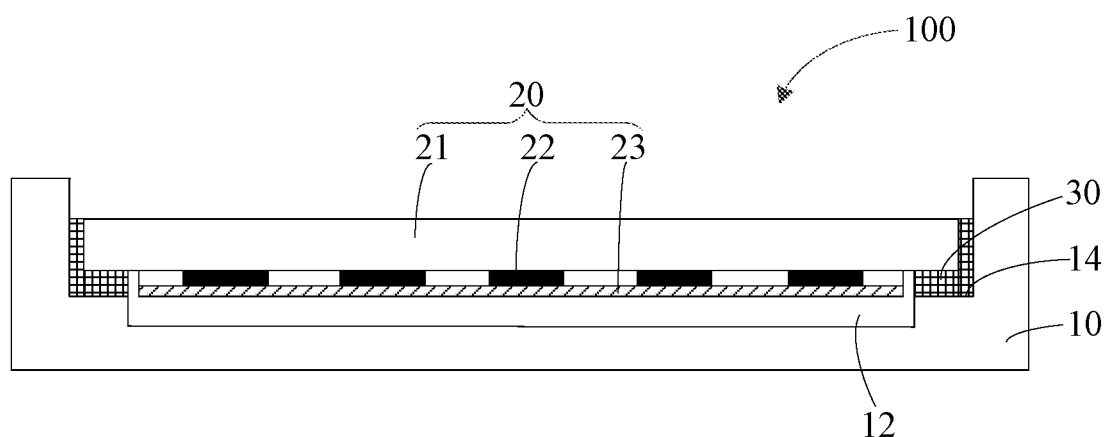
FIG. 3 to FIG. 5 are schematic structural diagrams of a target assembly according to some embodiments of the present invention, bonding manners of the target unit and a housing being different in the target assembly shown in FIG. 3 to FIG. 5.

It may be understood that, in some embodiments, referring to FIG. 3, the bonding portion 30 may further bond an end surface of the protective plate 21 and an inner wall of the receiving groove 12. The bonding portion 30 has an "L"-shaped cross section in a direction perpendicular to the connection surface 210, so that the bonding portion 30 can more firmly bond the protective plate 21 to the housing 10, and the bonding portion 30 fills a gap between the protective plate 21 and the inner wall of the receiving groove 12, thereby achieving better effects of antivibration and fall prevention and water and dust resistance of the target assembly 100.

Figure 4:
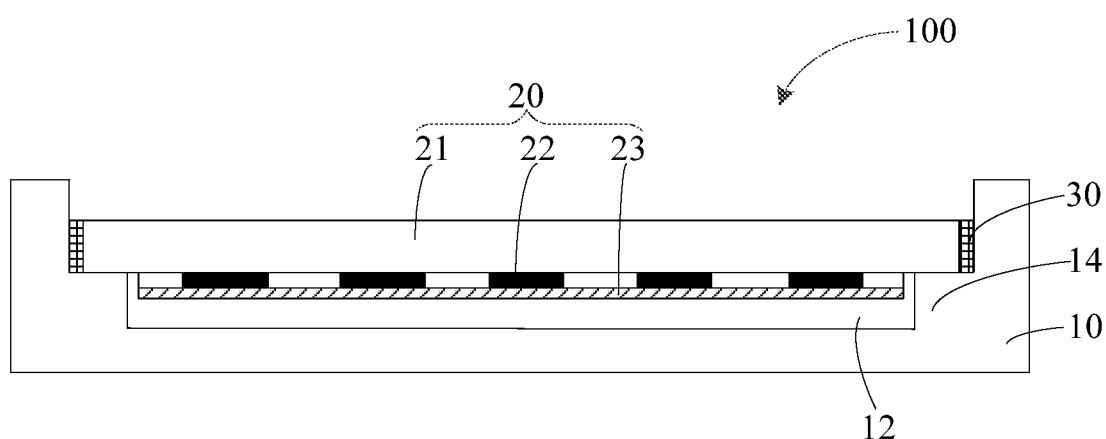

It may be understood that, in some embodiments, referring to FIG. 4, the bonding portion 30 may alternatively bond only the end surface of the protective plate 21 and the inner wall of the receiving groove 12, so that the protective plate 21 is fixed to the housing 10.

Figure 5:
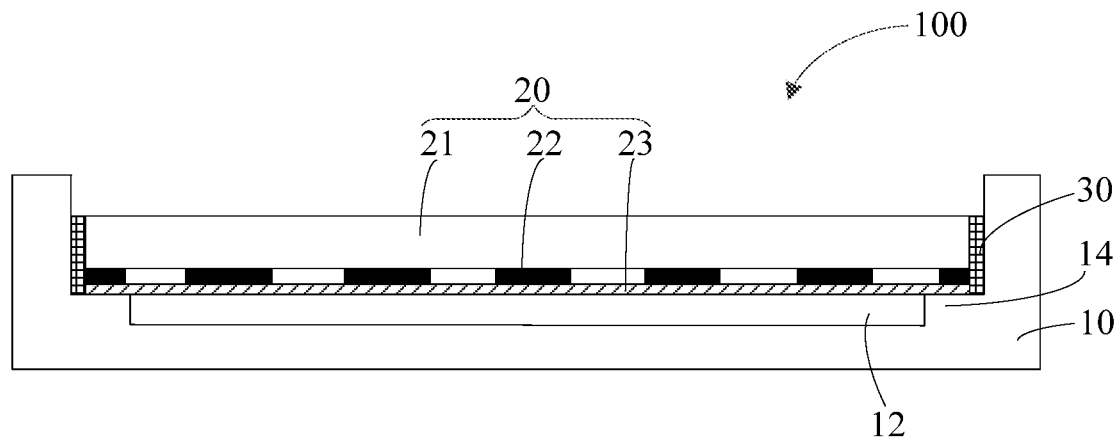

It may be understood that, in some embodiments, referring to FIG. 5, a difference among the area of the protective plate 21, the area of the light absorbing layer 22 and the area of the light reflecting layer 23 may not be large, so that at least one of the light absorbing layer 22 or the light reflecting layer 23 is supported on the step portion 14. This case may also be applicable to the embodiments of the present invention under specific precision requirements. This is generally due to process conditions limitations, or in consideration of achieving a particular purpose. For example, an area of the connection surface 210 may be equal to the area of the light absorbing layer 22 and the area of the light reflecting layer 23 actually, the end surface of the protective plate 21, the end surface of the light absorbing layer 22 and the end surface of the light reflecting layer 23 are flush, and a surface of the light reflecting layer 23 that faces away from the protective plate is supported on the step portion 14.

In some embodiments, if the protective plate 21 is made of a fragile material, such as glass, a shatterproof material layer may be added to the protective plate 21. The shatterproof material layer may be attached to the connection surface 210 of the protective plate 21 or the other surface opposite to the connection surface 210, or the protective plate 21 is sandwiched between two fragile material layers. The shatterproof material layer may be a well-applied light transmission film, and the light or the electromagnetic wave in the working band of the target unit 20 may pass through the light transmitting film.

In the target unit 20 shown in FIG. 1 to FIG. 5, the light absorbing layer 22 is separately directly connected to the protective plate 21 and the light reflecting layer 23. It may be understood that, in some embodiments, a person skilled in the art may add a required layer structure between the protective plate 21 and the light absorbing layer 22, or between the light absorbing layer 22 and the light reflecting layer 23 according to actual requirements or requirements in a preparation process.

In some embodiments, the light absorbing layer 22 and the light reflecting layer 23 are independent layer structures. For example, the light absorbing layer 22 is a film negative, and the light reflecting layer 23 is a light reflecting sheet. The target unit 20 may be prepared by using the following preparation method:

The protective plate 21, the light absorbing layer 22 and the light reflecting layer 23 are bonded together, so that the light absorbing layer 22 is connected to the protective plate 21 through the connection surface 210, and the surface 230 of the light reflecting layer 23 that faces away from the protective plate 21 is the outer surface of the target unit 20, to obtain the target unit 20. The periphery of each layer may be bonded by using adhesive, or every two layers may be bonded by using adhesive.

In some embodiments, any two that are among the protective plate 21, the light absorbing layer 22 and the light reflecting layer 23 and that are in contact with each other may be bonded in a whole surface by coating the whole surface with transparent adhesive or bonding a transparent backing adhesive, so that any two that are in contact with each other are combined with each other. Such a bonding manner has better moisture resistance and stability, and the bonded layers do not easily move relative to each other or deform. In this case, preferably, the adhesive used for bonding is transparent adhesive, without affecting the capture and imaging of the camera device on light or the electromagnetic wave. In the current process condition, liquid or semi-liquid transparent adhesive may be coated on a plane in a very thin and uniform manner. For example, a coating thickness is approximately 0.1 mm to 0.02 mm or even lower (for example, close to 0.01 mm). Thinner adhesive brings a smaller change in an absolute thickness due to uneven brushing and coating thicknesses, and therefore, an effect on refraction and reflection paths of light or electromagnetic waves is smaller. If the adhesive can be brushed very uniformly, adhesive with a larger thickness may alternatively be applicable.

In some embodiments, contact surfaces between any two that are among the protective plate 21, the light absorbing layer 22 and the light reflecting layer 23 and that are in contact with each other are not bonded, but the bonding portion 30 bonds the end surface of the protective plate 21, the end surface of the light absorbing layer 22 and the end surface of the light reflecting layer 23, to bond the protective plate 21, the light absorbing layer 22 and the light reflecting layer 23 together.

In some embodiments, non-pattern regions of edges of at least two of the protective plate 21, the light absorbing layer 22 and the light reflecting layer 23 or other regions that do not affect the pattern may be coated with the adhesive to bond the protective plate 21, the light absorbing layer 22 and the light reflecting layer 23 together. For example, the adhesive may be manually dispensed on non-pattern regions of edges of two layers, and then the two layers are bonded.

Figure 6:
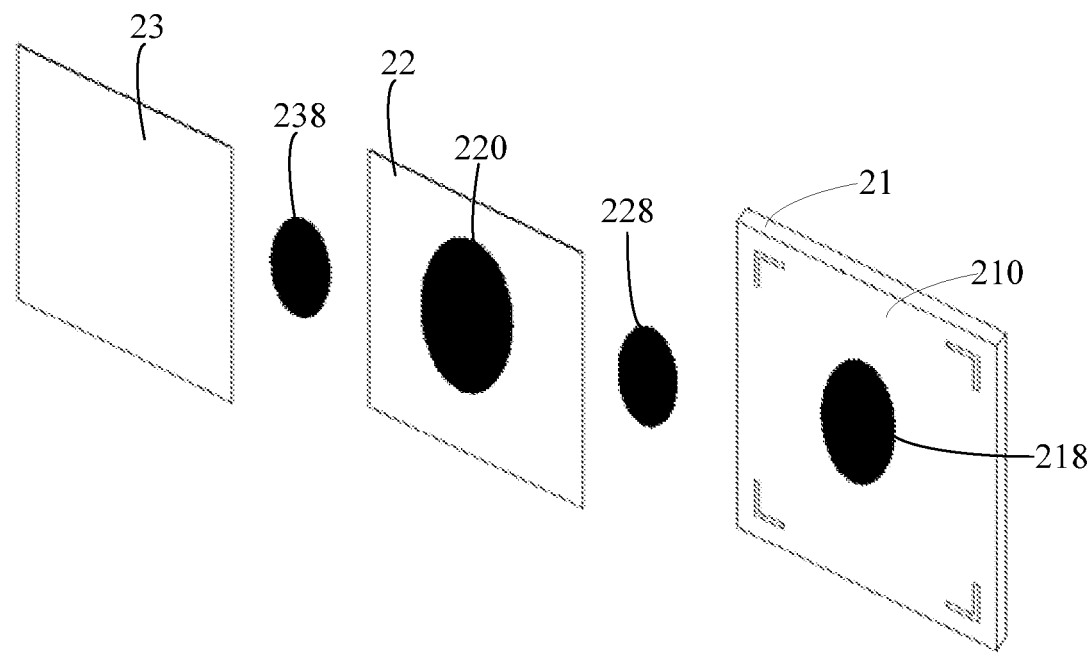
FIG. 6 is a schematic diagram of bonding of a protective plate, a light absorbing layer and a light reflecting layer of the target unit shown in FIG. 1 to FIG. 5.

In some embodiments, referring to FIG. 6, the protective plate 21, the light absorbing layer 22 and the light reflecting layer 23 may alternatively be bonded together by using a local bonding manner. In the local bonding manner, the adhesive may be coated on a part of the pattern regions, so that the adhesive is not exposed through the protective plate 21. In an embodiment, the pattern is formed in the light absorbing layer 22. That is, the light absorbing layer 22 includes several light absorbing regions (for example, black or dark patterns) and several light transmission regions. For example, the light absorbing layer 22 may be a patterned film negative with a black pattern, and a remaining region is a light transmission portion. The protective plate 21 may be glass, and the light reflecting layer 23 may be a light reflecting paper. FIG. 6 shows only an exemplary light absorbing region 220 in the light absorbing layer 22, that is, an exemplary black or dark pattern, to describe the bonding method of each layer. A pattern may be formed on the connection surface 210 of the protective plate 21, and as shown in the figure, the pattern is an exemplary shield region 218. A first bonding layer 228 may be formed on the protective plate 21 on which the pattern has been formed using a printing technology such as silk screen printing. The first bonding layer 228 may be formed on the protective plate 21 by using any feasible process. The first bonding layer 228 includes a pattern and has adhesive only at the pattern, and the pattern of the first bonding layer corresponds to the pattern on the protective layer 21, except that the size of each pattern of the first bonding layer is less than the size of a corresponding pattern on the protective layer 21, so that the adhesive is not exposed through the glass protective plate. In such a setting manner of the adhesive, the first bonding layer 228 may use dark adhesive, without limiting colors or transparency of the adhesive, and the product appearance is not affected. Certainly, if an effect on the product appearance is not considered, or the protective plate is not a visually transparent material such as glass, such a setting manner of the adhesive may not be used.

FIG. 6 shows an exemplary bonding region 228 of a pattern of the first bonding layer 228. For ease of description, the bonding region is referred to as a first bonding region. After the first bonding layer 228 is manufactured, a backing adhesive paper may be temporarily attached, to protect the bonding layer. When the first bonding layer needs to be bonded with the film negative 22, the backing adhesive paper is removed to perform bonding. A pattern on the film negative 22 corresponds to the pattern on the protective layer 21, but the size of the pattern on the film negative 22 is slightly greater than the size of a corresponding pattern on the protective layer 21, so that an outer edge of the pattern on the film negative 22 can be exposed. As shown in FIG. 6, the light absorbing region 220 is slightly larger than the shield region 218, so that the outer edge of the light absorbing region 220 can be exposed. This is because the precision of the pattern is directly related to the precision of the machine vision system. Regardless of whether the pattern is formed on the light absorbing layer or the light reflecting layer, a technology with a precision requirement is preferably used. For example, in this embodiment, a pattern with higher precision can be obtained by using a film negative, to meet requirements of high-precision measurement. In contrast, the requirement on the precision of the pattern formed on the protective plate does not need to be very high, and a process with lower precision requirements may be used for manufacturing. Therefore, when a cursor target is manufactured, an outer edge of a high-precision pattern needs to be exposed, so that the camera device captures images. Actually, in consideration of image recognition, provided that the outer edge of the light absorbing region 220 is partially exposed, the requirements of image recognition and measurement may be met.

The first bonding layer 228 may alternatively be disposed on the light absorbing layer 22, and a setting manner and an alignment and bonding method are similar to those of a case in which the first bonding layer is disposed on the protective plate.

In an embodiment, the protective plate 21 may be slightly larger than the light absorbing layer 22 and the light reflecting layer 23, to sufficiently enable the protective plate 21 to be in contact with the target housing and dispose a sealant. The light absorbing layer 22 and the light reflecting layer 23 may have the same size. On the protective plate 21, alignment marks may be provided to assist alignment of patterns of the layers. As shown in FIG. 6, the alignment marks may mark positions of four top corners of the light absorbing layer 22 and the light reflecting layer 23. The light absorbing layer 22 may be a film negative, and the light reflecting layer 23 may be a light reflecting paper. By aligning the film negative and the light reflecting paper according to the four top corners, the alignment between the patterns of the layers can be implemented. In an embodiment, the alignment marks may further mark positions of a periphery of the light absorbing layer 22 and the light reflecting layer 23, or mark positions of four edges, or be arranged at other suitable positions to make corresponding marks. In an embodiment, commonly used alignment marks such as a cross-shaped star may be used. In an embodiment, the shape of the alignment mark may be optimized to improve alignment precision. For example, the thickness of a mark line of the alignment mark may have a gradient, and an end of the line may have a smaller feature size to obtain higher alignment precision. In addition to the use of the alignment marks, other commonly used alignment manners in the art may alternatively be used. For example, alignment may be performed by aligning the target patterns and then with the aid of use of a ruler.

A second bonding layer 238 may be formed on the light reflecting paper 23. The second bonding layer 238 may include a pattern. FIG. 6 shows an exemplary bonding region, which is referred to as a second bonding region (a reference numeral 238 is also used) The second bonding region is smaller than the pattern light absorbing region 220, so that the second bonding region is not exposed through the protective plate 21. The second bonding layer 238 may be formed on the light reflecting paper 23 by silk screen printing or the like, and then the backing adhesive is attached, to protect the adhesive. When bonding is required, the backing adhesive is removed. The second bonding layer is aligned with the alignment marks provided on the protective plate 21, to implement the alignment of the second bonding region 238 relative to the pattern light absorbing region 220 and the shield region 218. In an embodiment, the second bonding layer 238 may be disposed on the light absorbing layer 22, and a setting manner and an alignment and bonding method are similar to those of a case in which the second bonding layer is disposed on the light reflecting plate.

A person skilled in the art may understand that, it is not excluded that due to special requirements, other substances or layer structures may be further disposed between layers of the protective plate 21, the light absorbing layer 22 and the light reflecting layer 23.

All adhesive between the foregoing layers may be disposed on corresponding layers by manual gluing as required.

In some embodiments, the light absorbing layer 22 and the light reflecting layer 23 are not independent layer structures, but are formed on another layer by printing or photoetching. The target unit 20 may be prepared by using the following preparation method: in an embodiment, the preset pattern is formed on the connection surface 210 by photoetching or printing, a layer structure formed by the pattern being the light absorbing layer 22; and the light reflecting layer 23 is bonded to the light absorbing layer 22, or a light reflecting material is coated on the light absorbing layer 22 to form the light reflecting layer 23, to obtain the target unit 20. Specifically, the preset pattern (that is, a light absorbing pattern) may be formed in the following manner: black or dark ink may be printed on the connection surface 210 to form a light absorbing pattern; or the connection surface 210 may be coated with dark photosensitive adhesive, then exposure is performed by using a mask, and exposed or unexposed parts are washed away after the exposure, to obtain the light absorbing pattern. After the pattern is formed on the connection surface 210, the light absorbing layer 22 and the protective plate 21 may be aligned and bonded in a manner similar to the foregoing manner in this specification.

In another embodiment, the target unit 20 may be obtained by using the following preparation method: the preset pattern is formed on one surface of the light reflecting layer 23 by photoetching or printing, the layer structure formed by the pattern being the light absorbing layer 22; the protective plate 21 is bonded to the light absorbing layer 22, and a surface of the light reflecting layer 23 that faces away from the protective plate 21 is an outer surface, to obtain the target unit 20.

Specifically, the preset pattern (that is, the light absorbing pattern) may be formed on the light reflecting layer 23 in the following manner: ink may be directly printed on the surface of the light reflecting layer 23 to form the light absorbing pattern; or the surface of the light reflecting layer 23 may be coated with dark photosensitive adhesive, then exposure is performed by using the mask, and exposed or unexposed parts are washed away after the exposure, to obtain the light absorbing pattern. Preferably, the light reflective layer 23 is light reflecting paper whose surface has a plastic film, and the flat surface of the plastic film is beneficial for printing and photoetching. The light reflecting layer 23 may alternatively be an ordinary light reflecting paper or a white paper, and printing may also be performed on the surface thereof to form the light absorbing pattern. The light reflecting layer 23 may be made of a thin film or a hard plate material. After the pattern is formed on the light reflecting layer 23, the light reflecting layer 23 and the protective plate 21 may be aligned and bonded in a manner similar to the foregoing manner in this specification.

In an embodiment, both the light absorbing layer 22 and the light reflecting layer 23 are formed on the protective plate 21. The light absorbing pattern may be formed on the protective plate 21 in the similar manner described above. Then, white or light-colored ink is printed on the protective plate 21, or a liquid or semi-liquid light reflecting substance is coated on the protective plate 21 on which the pattern has been formed. The target unit formed in this manner has an integrated effect, and is lighter and thinner.

In this embodiment, the printing methods include silk screen printing (screen printing), transfer printing and spray printing (commonly known as "jet printing"), and other printing methods.

In an embodiment, the positions of the light absorbing layer and the light reflecting layer may be exchanged, that is, the light reflecting layer may be located between the light absorbing layer and the protective plate. Therefore, the light reflecting layer is connected to the light absorbing layer, one of the light absorbing layer and the light reflecting layer includes a preset pattern and is connected to the protective plate through the connection surface, and a surface that is of the other of the light absorbing layer and the light reflecting layer and that faces away from the protective plate is an outer surface of the target unit, to implement the functions of the target unit in the present application.

Figure 7:
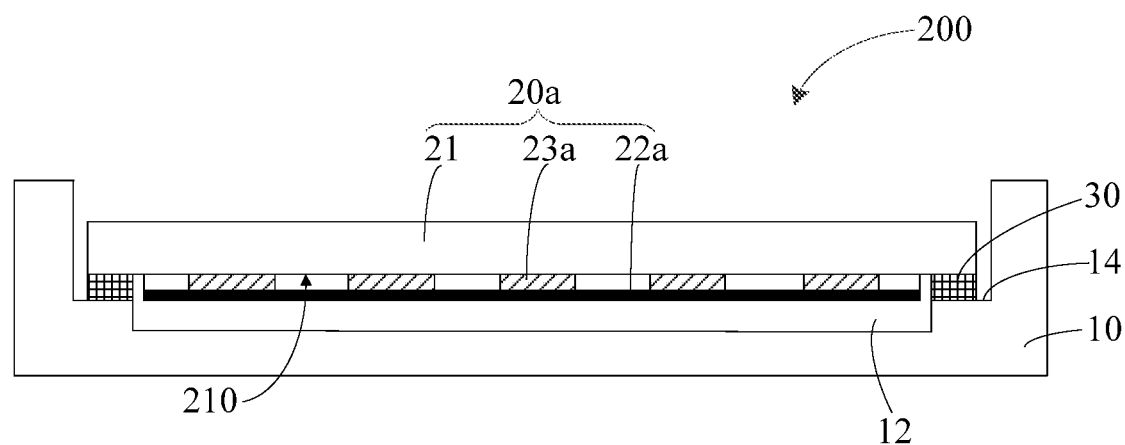
FIG. 7 is a schematic structural diagram of a target assembly of a machine vision system according to an embodiment of the present invention.
Figure 8:
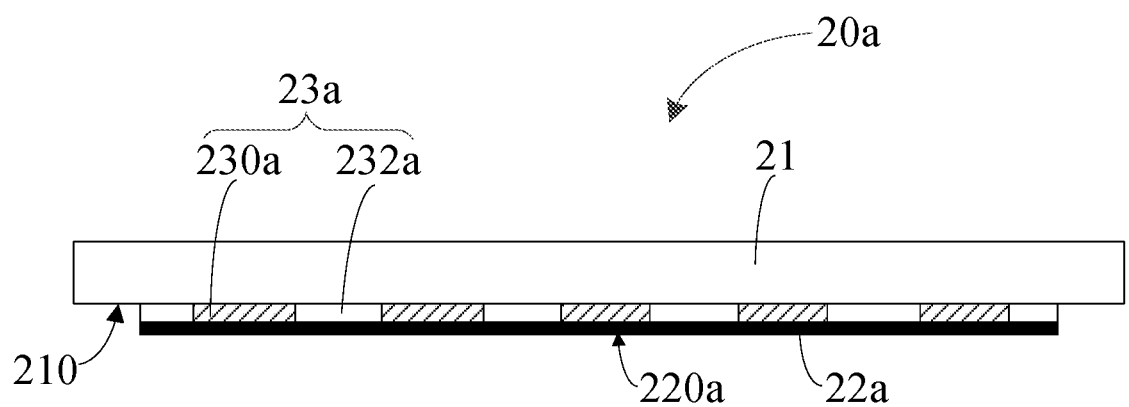
FIG. 8 is a schematic structural diagram of a target unit of the target assembly shown in FIG. 7, a light reflecting layer being located between a protective plate and a light absorbing layer in the target unit.

Referring to FIG. 7 and FIG. 8 together, the target assembly 200 provided in the embodiments of the present invention is basically the same as the target assembly 100 shown in FIG. 1 and FIG. 3 to FIG. 5, and a difference is that, the light reflecting layer 23a is located between the light absorbing layer 22a and the protective plate 21, the light reflecting layer 23a includes the preset pattern, and the light reflecting layer 23a is connected to the protective plate 21 through the connection surface 210. The light absorbing layer 22a is connected to the light reflecting layer 23a, and a surface 220a of the light absorbing layer 22a that faces away from the protective plate 21 is an outer surface of the target unit 20a.

The pattern includes a pattern light reflecting region 230a and a pattern light transmission region 232a.

The pattern light reflecting region 230a is used for reflecting the light or the electromagnetic wave passing through the protective plate 21, so that the reflected light or electromagnetic wave passes through the protective plate 21 again to enter the camera. The pattern light reflecting region 230a may be made of light reflecting materials or other materials that can reflect the light or the electromagnetic wave passing through the protective plate 21, such as a light reflecting paper, a retro light reflecting paper and a white paper.

In some embodiments, the pattern light reflecting region 230a is a retro light reflecting layer, and generally, may be a retro light reflecting paper, or a retro light reflecting film whose surface is a plastic film. If the camera device is relatively far away from the target and captures insufficient light, or has a relatively high requirement on target pattern imaging definition, preferably, the retro light reflecting layer is used as the light reflecting layer of the target. For example, in a four-wheel positioning system of a vehicle, the target unit 20a with the retro light reflecting layer is generally used.

The pattern light transmission region 232a may be a hollow region or a light transmitting material, and may allow light or an electromagnetic wave in the working band of the target unit 20a to pass through.

In some embodiments, the light reflecting layer 23a is a plate or sheet structure such as a light reflecting paper or a white paper. A part of the material is removed by blanking by a cutting device, laser cutting and the like, to form the hollow pattern light transmission region 232a.

The light absorbing layer 22a is made of a light absorbing material, so that when the light or the electromagnetic wave passing through the pattern light transmission region 232a is irradiated on the light absorbing layer 22a, there is no transmission at the irradiated position, or no flare and reflection are generated. For example, the light absorbing material may be a black material.

It may be understood that, in some embodiments, an area of the connection surface 210 is equal to an area of the light absorbing layer 22a and an area of the light reflecting layer 23a, an end surface of the protective plate 21, an end surface of the light absorbing layer 22a and an end surface of the light reflecting layer 23a being flush. The light absorbing layer 22a may be supported on the step portion 14.

In some embodiments, the light absorbing layer 22a and the light reflecting layer 23a are independent layer structures. For example, the light absorbing layer 22a is made of a black paper or a black plastic sheet (PVC, PC, PE or the like), and the light reflecting layer 23a is a plate or sheet structure such as a light reflecting paper or a white paper. A part of the material is removed by blanking by a cutting device, laser cutting and the like, to form the hollow pattern light transmission region 232a. The target unit 20a may be obtained by the following preparation method: bonding the protective plate 21, the light absorbing layer 22a and the light reflecting layer 23a together, so that the light reflecting layer 23a is connected to the protective plate 21 through the connection surface 210, and the surface 220a of the light absorbing layer 22a that faces away from the protective plate 21 is the outer surface of the target unit 20a, to obtain the target unit 20a.

In some embodiments, any two that are among the protective plate 21, the light absorbing layer 22a and the light reflecting layer 23a and that are in contact with each other may be bonded in a whole surface by coating the whole surface with transparent adhesive or bonding a transparent backing adhesive, so that any two that are in contact with each other are combined with each other together.

In some embodiments, contact surfaces between any two that are among the protective plate 21, the light absorbing layer 22a and the light reflecting layer 23a and that are in contact with each other are not bonded, but the bonding portion 30 bonds the end surface of the protective plate 21, the end surface of the light absorbing layer 22 and the end surface of the light reflecting layer 23, to bond the protective plate 21, the light absorbing layer 22a and the light reflecting layer 23a together.

In some embodiments, non-pattern regions of edges of the protective plate 21, the light absorbing layer 22a and the light reflecting layer 23a may be coated with the adhesive to bond the protective plate 21, the light absorbing layer 22a and the light reflecting layer 23a together.

Figure 9:
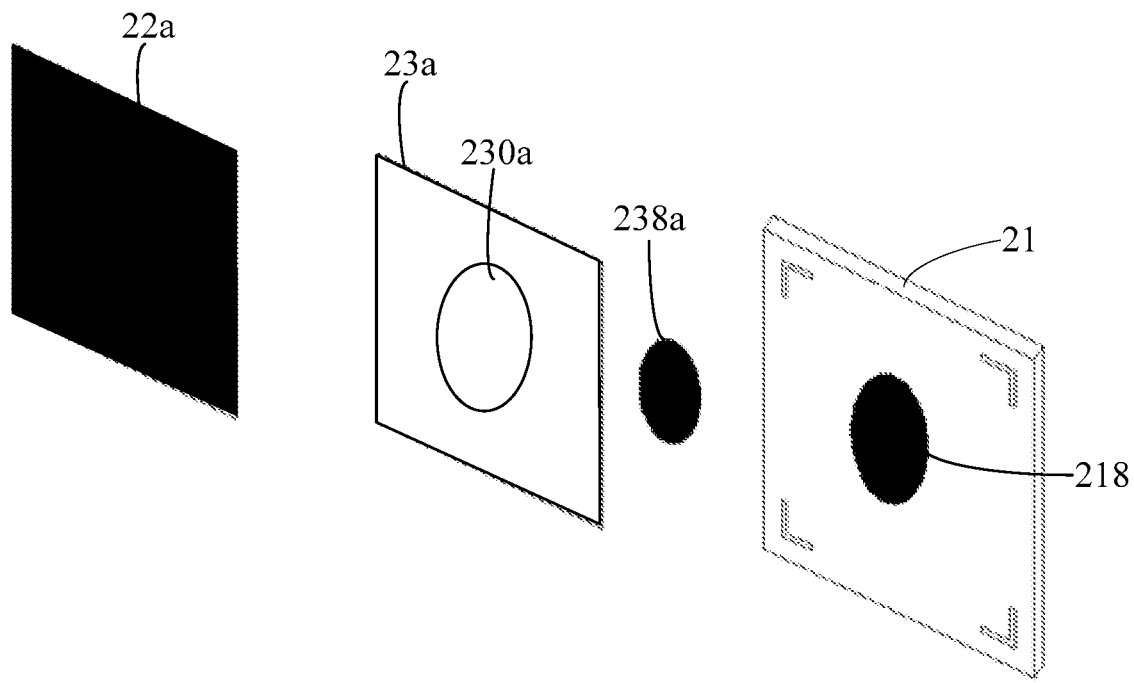
FIG. 9 is a schematic diagram of bonding of a protective plate, a light absorbing layer and a light reflecting layer of the target unit shown in FIG. 8.

In some embodiments, referring to FIG. 9, the protective plate 21, the light absorbing layer 22a and the light reflecting layer 23a may alternatively be bonded together by using a local bonding manner. In the local bonding manner, the adhesive may be coated on a part of the pattern regions, so that the adhesive is not exposed through the protective plate 21. In an embodiment, the pattern is formed in the light reflecting layer 23a, that is, the light reflecting layer 23a includes several light reflecting regions and several light transmission regions. For example, the light reflecting layer 23a may be made of a light reflecting paper that has been cut, and some regions of the light reflecting paper are removed by laser cutting and the like. The protective plate 21 may be made of glass, and the light absorbing layer 22a may be made of a black or dark paper, cloth or film. FIG. 6 shows only an exemplary light transmission region 230a in the light reflecting layer 23a, that is, an exemplary hollow region from which the light reflecting paper is removed, to describe the bonding method of each layer. Because the light reflecting layer 23a is tightly attached to the light absorbing layer 22a in the prepared target, the light transmission region 230a is actually the pattern light absorbing region 230a of the target. A pattern may be formed on the connection surface 210 of the protective plate 21, and as shown in the figure, the pattern is an exemplary shield region 218. The first bonding layer 238a may be formed in the shield region 218, so that the pattern light absorbing region 230a is aligned with the shield region 218. The protective plate 21 is attached to the light reflecting layer 23a, and the light absorbing layer 22a is attached to the light reflecting layer 23a, so that the first bonding layer 238 is bonded between the light absorbing layer 22a and the protective plate 21, and the light reflecting layer 23a is clamped between the protective plate 21 and the light absorbing layer 22a. The first bonding layer 228 includes a first bonding region, the first bonding region being separately located in the pattern light absorbing region 230a and the shield region 218. The shield region 218 is larger than the first bonding region, so that the first bonding region is not exposed through the protective plate 21, and the shield region 218 is smaller than the pattern light absorbing region 230a, so that at least a part of an edge between the pattern light absorbing region 230a and the pattern light transmission region 232a is exposed through the protective plate 21. For a specific implementation method and a principle, refer to the description of the embodiment shown in FIG. 6.

A person skilled in the art may understand that, it is not excluded that due to special requirements, other substances or layer structures may be further disposed between layers of the protective plate 21, the light reflecting layer 23a and the light absorbing layer 22a.

All adhesive between the foregoing layers may be disposed on corresponding layers by manual gluing as required.

In some embodiments, the light absorbing layer 22a and the light reflecting layer 23a are not independent layer structures. The target unit 20a may be prepared by using the following preparation method: the preset pattern is formed on the connection surface 210 by photoetching or printing, the layer structure formed by the pattern being the light reflecting layer 23a; the light absorbing layer 22a is bonded to the light reflecting layer 23a, or the light absorbing material is coated on the light reflecting layer 23a to form the light absorbing layer 22a, to obtain the target unit 20a.

Specifically, the preset pattern (that is, the light reflecting pattern) may be formed in the following manner: the white or light-colored ink or the light reflecting substance may be printed on the connection surface 210 to form the light reflecting pattern. After the pattern is formed on the connection surface 210, the light absorbing layer 22a and the protective plate 21 may be aligned and bonded in a manner similar to the foregoing manner in this specification.

Alternatively, the target unit 20a may be prepared by using the following preparation method: the preset pattern is formed on one surface of the light absorbing layer 22a by photoetching or printing, the layer structure formed by the pattern being the light reflecting layer 23a; the protective plate 21 is bonded to the light reflecting layer 23a, and a surface of the light absorbing layer 22a that faces away from the protective plate 21 is the outer surface, to obtain the target unit 20a.

Specifically, the preset pattern may be formed on the light absorbing layer 22a in the following manner: the white or light-colored ink or the light reflecting substance may be directly printed on the surface of the light absorbing layer 22a to form the light reflecting pattern. The surface of the light absorbing layer 22a may be made of materials such as plastic, paper and cloth, and the light absorbing layer 22a may be made of a film or a hard plate material. All these materials may be printed on the surface under the current process condition. After the pattern is formed on the light absorbing layer 22a, the light absorbing layer 22a and the protective plate 21 may be aligned and bonded in a manner similar to the foregoing manner in this specification.

In an embodiment, both the light absorbing layer 22a and the light reflecting layer 23a are formed on the protective plate 21. The white or light-colored ink or the light reflecting substance may be printed on the protective plate 21 to form the light reflecting pattern. Then, the dark or black ink is printed on the protective plate 21 on which the pattern has been formed, or other dark or black substances are coated on the protective plate 21 on which the pattern has been formed. The target unit formed in this manner has an integrated effect, and is lighter and thinner.

In this embodiment, the printing methods include silk screen printing (screen printing), transfer printing and spray printing (commonly known as "jet printing"), and other printing methods.

Figure 10:
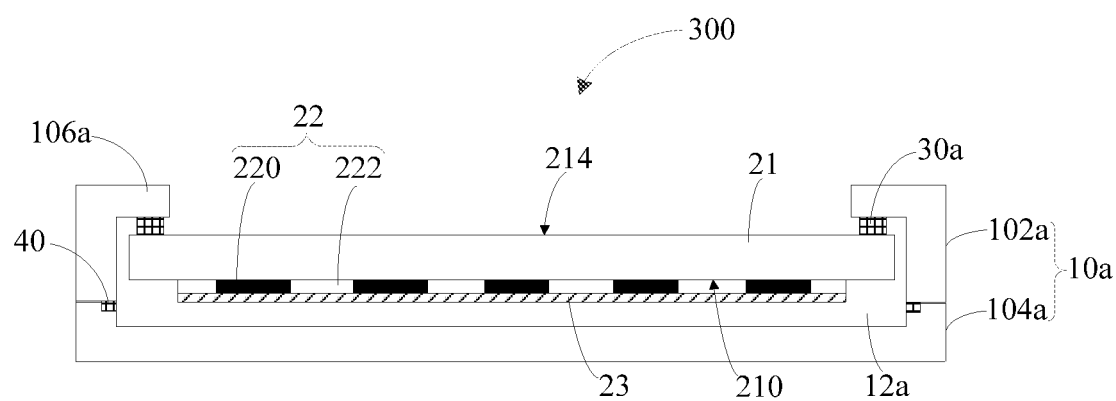
FIG. 10 to FIG. 12 are schematic structural diagrams of a target assembly of a machine vision system according to an embodiment of the present invention, a housing of the target assembly including a first housing and a second housing.

Referring to FIG. 10, the target assembly 300 provided in the embodiments of the present invention includes a housing 10a and the target unit 20 shown in FIG. 1 to FIG. 5.

The housing 10a includes a first housing 102a and a second housing 104a, the first housing 102 being mounted to the second housing 104a by using the adhesive 40, and the first housing 102a and the second housing 104a enclosing to form the receiving groove 12a. The adhesive 40 is a waterproof and dampproof adhesive.

The first housing 102a has a flange portion 106a, the flange portion 106a enclosing to form the opening of the receiving groove 12a.

The protective plate 21 includes a mounting surface 214, the mounting surface 214 and the connection surface 210 being respectively disposed on two opposite sides of the protective plate 21, and the mounting surface 214 being mounted on the flange portion 106a by using the bonding portion 30a. The bonding portion 30a may be made of the same material as the bonding portion 30a shown in FIG. 1 and FIG. 2 to FIG. 5, and details are not described herein again.

In this embodiment, the flange portion 106a encloses to form the opening of the receiving groove 12a, the mounting surface 214 being mounted to the flange portion 106a by using the bonding portion 30a. The flange portion 106a can prevent the target unit 20 from falling off from the housing 10a. In addition, the bonding portion 30a seals the light absorbing layer 22 and the light reflecting layer 23 in the receiving groove 12a, so that the target assembly 300 has a plurality of functions such as antivibration and fall prevention and water and dust resistance.

It may be understood that, in some embodiments, the target unit 20 may be replaced with the target unit 20a shown in FIG. 7 and FIG. 8.

Figure 11:
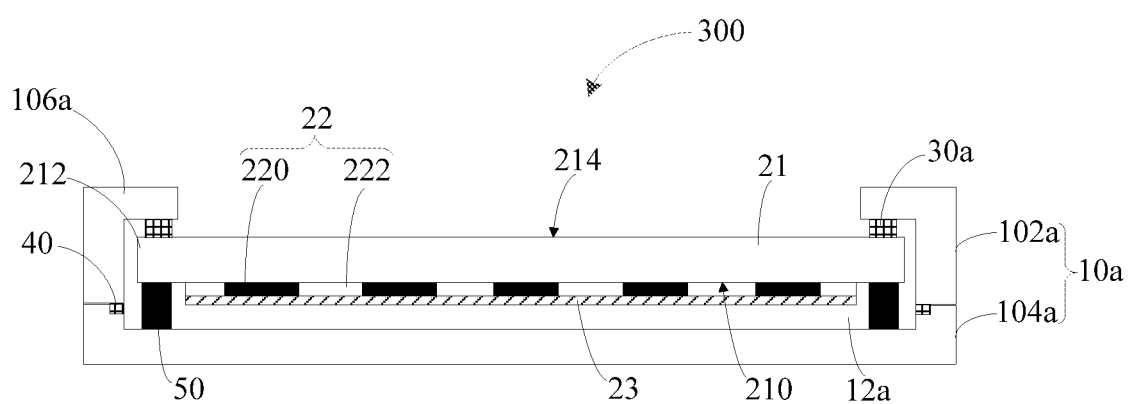

It may be understood that, in some embodiments, referring to FIG. 11, the target assembly 300 further includes a buffer portion 50. The buffer portion 50 is disposed between the edge portion 212 and a bottom wall of the receiving groove 12a. At least two buffer portions 50 are respectively disposed on two opposite sides of the protective plate 21. The bonding portion 30a and the buffer portion 50 jointly press against the protective plate 21, so that the protective plate 21 is firmly mounted to the housing 10a, and can prevent the protective plate 21 from being damaged when the target assembly 300 falls.

Figure 12:
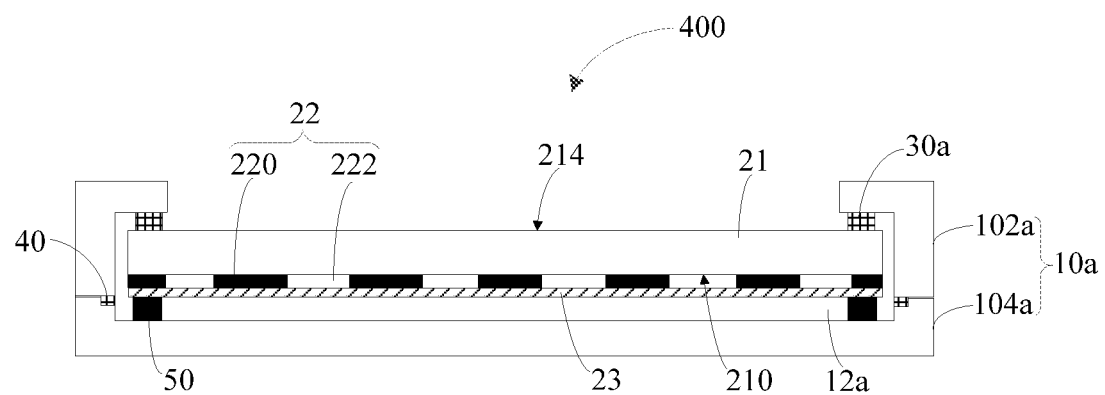

Referring to FIG. 12, the target assembly 400 provided in the embodiments of the present invention is basically the same as the target assembly 300 shown in FIG. 10, and a difference is that, the area of the connection surface 210 is equal to the area of the light absorbing layer 22 and the area of the light reflecting layer 23, the end surface of the protective plate 21, the end surface of the light absorbing layer 22 and the end surface of the light reflecting layer 23 being flush. The buffer portion 50 is disposed between the light reflecting layer 23 and the bottom wall of the receiving groove 12a. At least two buffer portions 50 are respectively disposed on two opposite sides of the light reflecting layer 23. The bonding portion 30a and the buffer portion 50 jointly press against the target unit 20.

Figure 13:
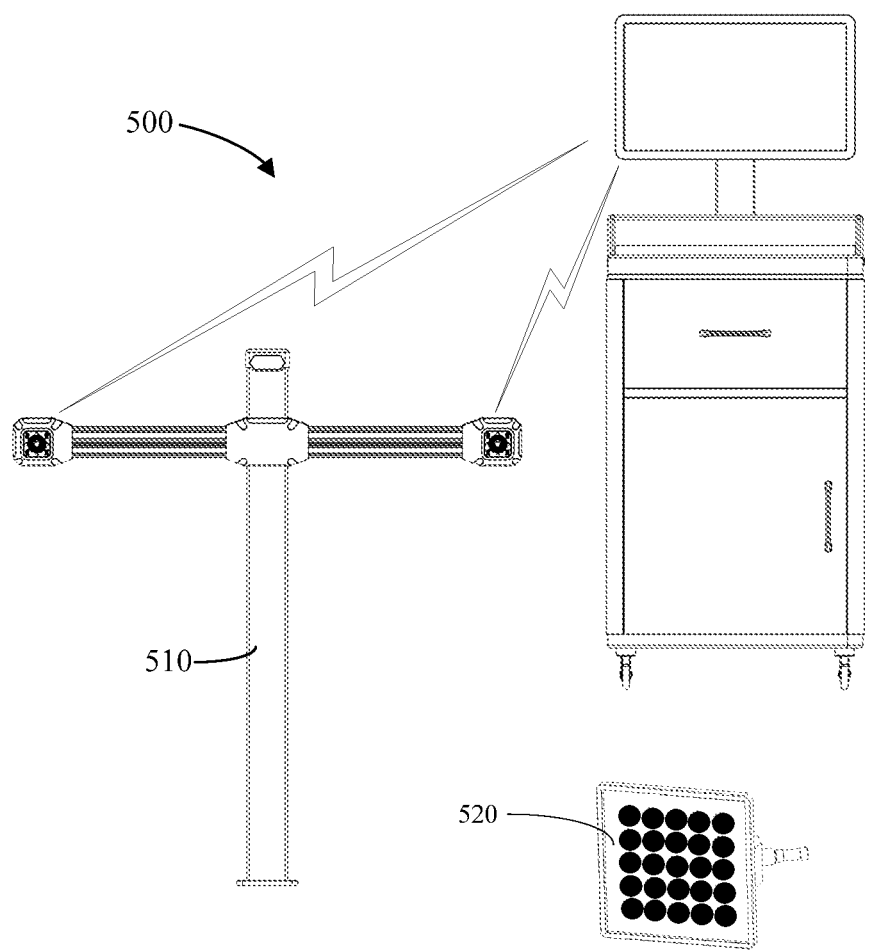
FIG. 13 is a schematic structural diagram of a machine vision system according to an embodiment of the present invention.

Referring to FIG. 13, the machine vision system 500 provided in the embodiments of the present invention includes a four-wheel aligner 510 of a vehicle and a target assembly 520. The four-wheel aligner 510 may be a four-wheel aligner in the prior art. The target assembly 520 may be the target assembly 100 shown in FIG. 1 and FIG. 3 to FIG. 5, or the target assembly 200 shown in FIG. 7, or the target assembly 300 shown in FIG. 10 and FIG. 11, or the target assembly 400 shown in FIG. 12. There are four target assemblies 520.

Figure 14:
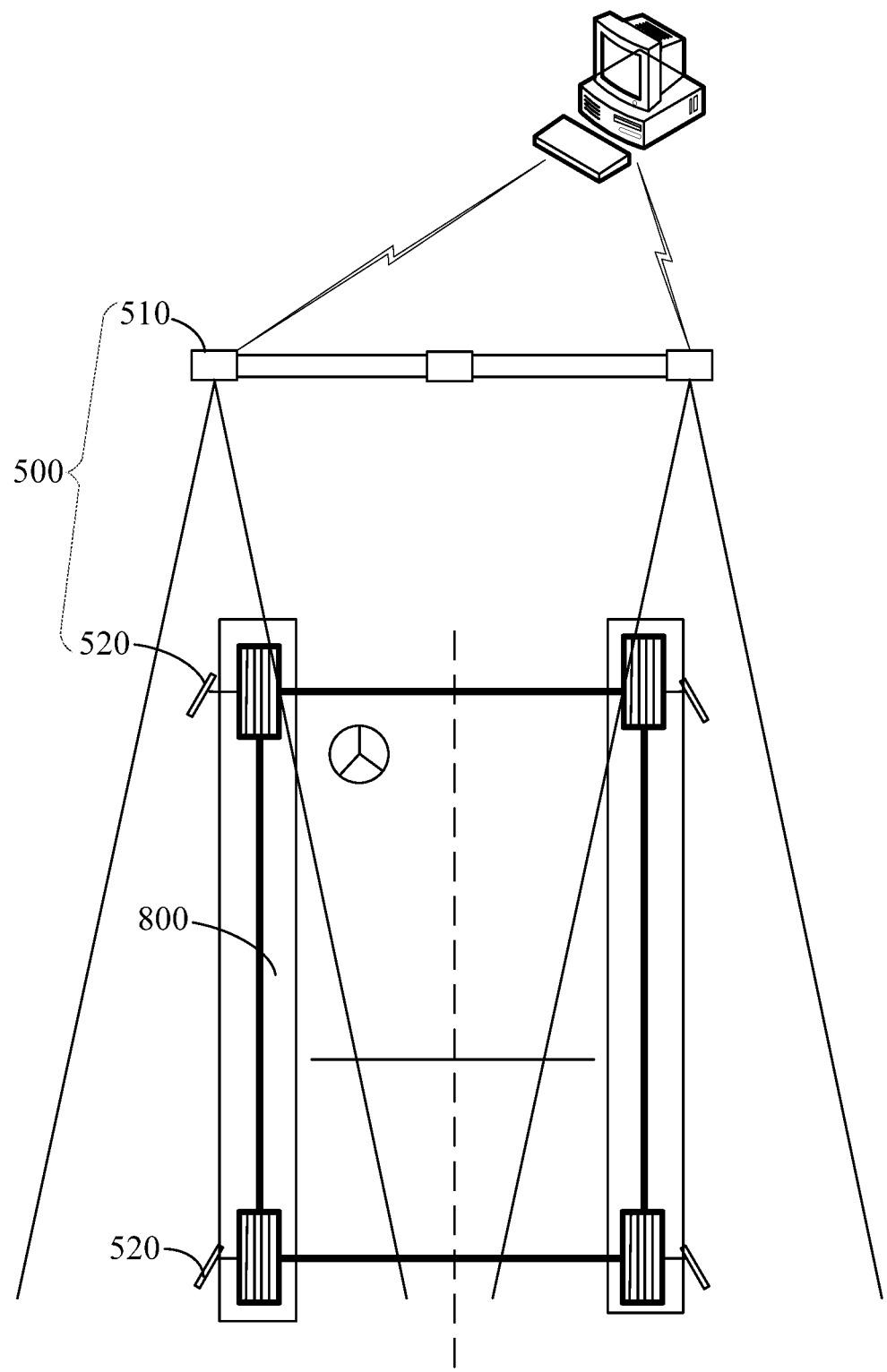
FIG. 14 is a schematic diagram of a use state of the machine vision system shown in FIG. 13.

Referring to FIG. 14, during use, the four target assemblies 520 are respectively mounted to four tires of a vehicle. A camera of the four-wheel aligner 510 shoots two target assemblies 520 located on one side of the vehicle, and the other camera of the four-wheel aligner 510 shoots the other two target assemblies 520 located on the other side of the vehicle. A computer of the four-wheel aligner 510 processes images shot by the two cameras, to obtain position information of the four target assemblies 520, to obtain parameters such as camber angles of the four tires, a driving height, a toe curve, an inclination angle, an angle relationship of a vehicle body relative to the tires and a position of a center line of the vehicle body.

In the target unit 20 and the target unit 20a provided in the embodiments of the present invention, the protective plate 21 can provide functions such as mechanical support, flatness and water resistance and scratch resistance, and a substrate in the prior art can be omitted, so that the weight of the target unit 20 and the target unit 20a in this embodiment is reduced, and the thickness of a product is reduced, enabling that it is possible to make a thinner product. In addition, a product assembly process is simplified, a production time is shortened, and product costs are reduced.

A person skilled in the art may understand that, the processes and materials described in the embodiments in this specification are only exemplary, and the embodiments of the present invention may use any future developed process or material suitable for the present invention.

Finally, it should be noted that the foregoing embodiments are merely used for describing the technical solutions of the present invention, but are not intended to limit the present invention. Under the ideas of the present invention, the technical features in the foregoing embodiments or different embodiments may also be combined, the steps may be performed in any order, and many other changes of different aspects of the present invention also exists as described above. These changes are not provided in detail for simplicity. It should be understood by a person of ordinary skill in the art that although the present invention has been described in detail with reference to the foregoing embodiments, modifications can be made to the technical solutions described in the foregoing embodiments, or equivalent replacements can be made to some technical features in the technical solutions; and such modifications or replacements do not cause the essence of corresponding technical solutions to depart from the scope of the technical solutions in the embodiments of the present invention.

What is claimed is:

1. A target unit of a machine vision system, comprising:
a protective plate, comprising a connection surface;
a light absorbing layer; and
a light reflecting layer, the light reflecting layer being connected to the light absorbing layer, one of the light absorbing layer and the light reflecting layer comprising a preset pattern and being connected to the protective plate through the connection surface, and a surface that is of the other of the light absorbing layer and the light reflecting layer and that faces away from the protective plate being an outer surface of the target unit;
wherein
the light absorbing layer comprises the preset pattern, the light absorbing layer being connected to the protective plate through the connection surface;
the light reflecting layer is connected to the light absorbing layer, a surface of the light reflecting layer that faces away from the protective plate being the outer surface of the target unit; and
the pattern comprises a pattern light absorbing region and a pattern light transmission region;
wherein
the light absorbing layer comprises a film negative, the film negative being connected to the protective plate through the connection surface.

2. The target unit according to claim 1, further comprising a first bonding layer, the first bonding layer being located between the light absorbing layer and the protective plate, and being used for bonding the light absorbing layer and the protective plate, and the first bonding layer comprising a first bonding region; and
the protective plate comprising a shield region, the shield region being larger than the first bonding region, so that the first bonding region is not exposed through the protective plate, and the shield region being smaller than the pattern light absorbing region, so that at least a part of an edge between the pattern light absorbing region and the pattern light transmission region is exposed.

3. The target unit according to claim 2, comprising a second bonding layer, the second bonding layer being located between the light absorbing layer and the light reflecting layer, and being used for bonding the light absorbing layer and the light reflecting plate, and the second bonding layer comprising a second bonding region; and the pattern light absorbing region being larger than the second bonding region, so that the second bonding region is not exposed through the protective plate.

4. The target unit according to claim 1, wherein the pattern is formed on the protective plate by photo-etching or printing.

5. The target unit according to claim 1, wherein the pattern is formed on the light reflecting layer by photoetching or printing.

6. The target unit according to claim 5, wherein the light reflecting layer comprises a thin film layer and a light reflecting substance formed on the thin film layer, the pattern being formed on the hard thin film layer.

7. The target unit according to claim 1, wherein the protective plate is a light transmission glass plate or a light transmission plastic plate.

8. The target unit according to claim 1, wherein the light reflecting layer is a retro light reflecting layer.

9. A target assembly, comprising:
a housing, provided with a receiving groove; and, a target unit,
wherein the target unit comprises:
a protective plate, comprising a connection surface;
a light absorbing layer; and
a light reflecting layer, the light reflecting layer being connected to the light absorbing layer, one of the light absorbing layer and the light reflecting layer comprising a preset pattern and being connected to the protective plate through the connection surface, and a surface that is of the other of the light absorbing layer and the light reflecting layer and that faces away from the protective plate being an outer surface of the target unit;
wherein
the light absorbing layer comprises the preset pattern, the light absorbing layer being connected to the protective plate through the connection surface;
the light reflecting layer is connected to the light absorbing layer, a surface of the light reflecting layer that faces away from the protective plate being the outer surface of the target unit; and
the pattern comprises a pattern light absorbing region and a pattern light transmission region;
wherein
the light absorbing layer comprises a film negative, the film negative being connected to the protective plate through the connection surface;
the protective plate being mounted to the housing, the protective plate being received in the receiving groove, and the connection surface facing away from an opening of the receiving groove.

10. The target assembly according to claim 9, wherein
an area of the connection surface is greater than an area of the light absorbing layer and an area of the light reflecting layer, so that the protective plate has an edge portion, the edge portion protruding from an edge of the light absorbing layer and an edge of the light reflecting layer;
an inner wall of the receiving groove is provided with a step portion, the edge portion being supported on the step portion; and
the light absorbing layer and the light reflecting layer are suspended in the receiving groove.

11. The target assembly according to claim 10, wherein
the protective plate comprises an end surface, the end surface being connected to the connection surface; and
the target assembly comprises a bonding portion, the bonding portion bonding the end surface of the protective plate and the inner wall of the receiving groove, so that the protective plate is fixed to the housing.

12. The target assembly according to claim 10, wherein
the protective plate comprises an end surface, the end surface being connected to the connection surface; and
the target assembly comprises a bonding portion, the bonding portion bonding the end surface of the protective plate and the inner wall of the receiving groove, and the bonding portion further bonding the connection surface and the step portion, so that the protective plate is fixed to the housing.

13. The target assembly according to claim 12, wherein the bonding portion has an "L"-shaped cross section in a direction perpendicular to the connection surface.

\* \* \* \* \*